2,991,166
PROPELLANT AND GAS PRODUCING COMPOSITIONS OF ELASTIC GELS CONTAINING INORGANIC OXIDIZING SALTS

Harry R. Ferguson, Morrisville, Pa., assignor to Thiokol Chemical Corporation, Trenton, N.J., a corporation of Delaware
No Drawing. Filed Aug. 18, 1955, Ser. No. 529,342
14 Claims. (Cl. 52—.5)

This invention relates to combustible compositions that contain the oxygen required for their combustion and more particularly to solid compositions of this type that comprise a hydrocarbon fuel and an oxidizing agent therefor, as well as to a method of making such compositions. Such compositions have been used to provide the propulsive power for rockets, aircraft booster, missiles and the like and for convenience will be referred to herein as propellants, although as the description proceeds it will be apparent that the compositions can also be employed for certain non-propulsive uses e.g. gas generators.

It has been recognized for many years that hydrocarbons because of their relatively high heat of combustion per unit weight are desirable fuels for rocket propulsion. However, the more useful hydrocarbons are in general liquid and when used for rocket propulsion require more or less elaborate pumping systems to pump them to the point where they are to be burned and mixing devices for mixing them with a material containing the oxygen for their combustion.

The need for pumps and mixing devices can be eliminated by employing a solid propellant, but difficulties have been encountered in formulating a solid propellant capable of satisfying the numerous practical requirements that must be met. Thus the propellant must be capable of burning at a relatively high predetermined rate and combustion must occur at a fairly uniform rate. If the combustion is irregular or incomplete due to non-homogeneity of the propellant, erratic performance of the rocket motor, or other device in which the propellant is used, will result. Moreover, combustion normally occurs at the outer surface of the propellant and if the propellant is of a brittle or friable character it may disintegrate to some extent due to physical or thermal shocks to which it may be subjected, thereby producing cracks or fissures that greatly increase the exposed surface area and consequently the gas evolution rate. Such a sudden increase in gas evolution rate may well produce a pressure increase sufficient to rupture the propellant casing.

It is accordingly an object of the present invention to provide a novel solid combustible composition containing the oxygen required for its combustion. It is another object of the invention to provide a solid propellant that is adapted to be used as a rocket fuel and is capable of satisfying the requirements for such fuels outlined above. It is still another object of the invention to provide a solid propellant containing a high proportion of hydrocarbon oils and having a rubbery, i.e. elastic, texture so that it does not develop cracks or fissures in use. It is a still further object of the invention to provide a propellant that may be selectively compounded to provide a variety of combustion rates. It is still another object of the invention to provide a propellant that is inexpensive and easy to manufacture. Other objects of the invention will be in part obvious and in part pointed out hereafter.

In one of its broader aspects the composition of the present invention comprises a rubbery gel having a finely divided oxidizing agent uniformly distributed therein. The principal combustible constituent of the composition is preferably a liquid hydrocarbon such as a mineral oil, and the desired rubbery texture is achieved by including natural or synthetic rubber in the composition as described in detail below. The compositions of the present invention are characterized by a very high oil content which may range up to 90 or 95% by weight of the rubbery gel. In general the compositions contain from 1 to 25 parts of oil per part of rubber.

Although the quantity of oil in the present composition is much greater than the quantity of rubber, it has been found desirable in compounding the present composition to add the oil to the rubber rather than adding the relatively small quantity of rubber to the oil. In accordance with a typical embodiment of the present method an oil of the type described below is added to an uncured, oil-extended GR–S rubber on a rubber mill. The oil is added at a slow enough rate to permit it to be thoroughly dispersed in the rubber. As the oil is added to the rubber, the mixture becomes more fluid and eventually reaches a consistency where it can no longer be worked effectively on a mill. Th oil-rubber ratio at this consistency depends upon the molecular weights of the oil and rubber used but typically may be about 4:1. If a still higher oil-rubber ratio is desired, the mixture can be transferred to a suitable mixer, such as a Baker-Perkins mixer and additional oil incorporated therein.

Prior to the incorporation of the oil in the rubber on the mill it may be desirable to add a peptizing agent to the rubber to facilitate incorporation of the oil. Any of various known peptizing agents may be used, one suitable agent being RPA No. 3 which is a 36.5% solution of xylyl mercaptan in an inert hydrocarbon solvent.

After a mixture of the desired oil-rubber ratio has been attained, a finely divided inorganic oxidizing agent of the type described below is dispersed therein and various conventional rubber compounding and curing agents are mixed therewith. It may be noted that the mixture of oil and uncured rubber is quite fluid at this stage of the process, a fact that greatly facilitates dispersion of the oxidizing agent therein. The resulting mixture is cured in accordance with procedures similar to those used in curing rubber, but is given a relatively soft cure. It has been found that a hard cure tends to force oil out of the mixture, and since a high degree of hardness is not required for the purposes for which the present product is used, a soft cure is preferred.

In preparing the present compositions any of various rubbers can be used such as butadiene polymers and copolymers e.g. GR–S rubber and Hycar; natural rubber; polychloroprene; butyl rubber; and oil-enriched GR–S rubber, natural rubber, and polybutadiene. Similarly a wide variety of oils may be used, the choice being largely dictated by economic consideration. In general, oils of the type known to be useful in the preparation of oil-extended rubbers are also useful in preparing the present compositions. Such oils may be mineral oils of the paraffinic, aromatic, or naphthenic type having pour points ranging from say −10° to 50° F. Vegetable and animal oils with comparable properties e.g. tall oil, may also be used, although most of the non-mineral oils are too expensive to be used economically in a fuel. Typical oils in this group that have been found particularly useful are Circosol 2XH which has a specific gravity of 0.540, a pour point of 5° F., and a Saybolt viscosity at 100° F. of about 2000; Dutrex No. 6 which is an aromatic nucleus oil with attached unsaturated olefins radicals having a specific gravity of 1.03, a melting point of 60° F. and a boiling point of 610° F.; and Sundex which has a specific gravity of 0.976, Saybolt viscosity of about 2400 at 100° F. and a pour point of 48° F. Lighter petroleum oils such as kerosene may also be used.

In cases where the product is to be used as a rocket propellant, it is desirable that the oxidizing agent to be selected from the group consisting of the ammonium, sodium and potassium salts of nitric, chloric and perchloric acids. Within the group ammonium nitrate and perchlorate are preferred since they are not only powerful oxidizing agents but also yield less residue and therefore less smoke than the corresponding sodium and potassium salts. For certain propulsive uses as well as for non-propulsive uses, a wider variety of oxidizing agents, both inorganic and organic, can be used including for example potassium permanganate, ammonium dichromate, metal peroxides, ammonium picrate, trinitrotoluene, tetryl and trinitrobenzene.

The relative proportions of oxidizing agent and oil-rubber mixture used depend upon the use to which the cured composition is to be put. Thus if the composition is to be used as a rocket fuel, it desirably contains from 65% to 95% by weight oxidizing agent. If on the other hand the composition is to be used for non-propulsive purposes or for propulsive uses wherein at least a part of the oxygen required for combustion is atmospheric oxygen, the amount of oxidizing agent incorporated may be as low as 10% by weight. The particle size of the oxidizing agent does not appear to be particularly critical.

In addition to the foregoing components, it is frequently desirable to include in the composition a small amount of a catalyst to increase the burning rate e.g. ammonium dichromate as well as many metal oxides.

As pointed out above, the preferred procedure for incorporating the oil in the rubber is milling. However various other procedures may be used, either alone or in combination with milling. Thus the rubber in the form of an emulsion or latex can be mixed with an oil emulsion and the mixture coagulated to yield a solid phase wherein the oil is intimately mixed with the rubber. Also it is possible to sheet the rubber polymer out in very thin layers and permit it to soak in oil either at room temperature or elevated temperature for an extended period of time. This latter method is not in itself particularly satisfactory for preparing the high oil content compositions of the present invention since the oil is adsorbed by the rubber only at a very slow rate and to a very limited extent. However it is sometimes useful to use this method in conjunction with one of the other methods mentioned. More generally, various combinations of the above methods may be used as desired.

It has been found that it is relatively difficult to incorporate the first portions of oil in the rubber, and that after the oil content of the mixture has been built up, additional quantities of oil can be added relatively easily. Hence the preferred method of incorporating the oil in the rubber involves the use of a so-called oil-extended rubber as a starting material. The oil-extended rubber is put on a mill and oil added in small increments and worked into the rubber until the mass becomes too soft and sticky to handle. If a higher oil content is desired, the mixture is then removed to a suitable mixer, such as a Baker-Perkins mixer, and further oil is incorporated at a rate such that the oil is taken up by the polymer and not merely mixed with broken particles of polymer. If the oil is added too rapidly, it does not mix with the rubber but merely lubricates broken particles of rubber and is not satisfactorily compounded. If however the oil is added sufficiently slowly the mixture picks it up to give a composition having a syrupy consistency and containing as much as 90–93% oil. Notwithstanding its high oil content, it has been found that this liquid mixture can be cured to give a rubbery gel in which the oil is intimately held, that is to say, the gel is dry to the touch and there is no visual evidence that it contains liquid oil.

When incorporation of the oil in the rubber has been completed a quantity of a conventional curing agent together with a finely divided oxidizing agent of the type indicated above are thoroughly mixed with the oil-rubber mixture and the rubber content of the mixture is cured to convert the mixture into a rubbery gel. Conventional compounding ingredients such as stearic acid, zinc oxide, carbon black, etc. can also be used. While curing can be effected at room temperature, usually an excessively long period of time is required at low temperatures, and hence the mixture is desirably cured at an elevated temperature to reduce the curing time. Temperatures up to 250° F. can be used, with fast short cures being obtained at the latter temperature. Ordinarily temperatures of the order of 160° F. can be used most satisfactorily.

In general, the curing agents used are those known to be effective for the particular type of rubber in composition to achieve the properties desired. Merely by way of illustration the following accelerators have been found satisfactory, either alone or in combination with other accelerators:

Tellurium diethyl dithiocarbamate (Ethyl Tellurac)
Piperidinium pentamethylene dithio carbamate (accelerator No. 582)
Benzothiazyl disulfide (Altax)
2-mercaptobenzolthiazole (Captax)
Tetramethyl thiuram disulfide (Methyl Tuads)
Zinc dibenzyl dithiocarbamate (Arozate)
Dibutyl xanthogen disulfide (CPS)
Copper diethyl dithiocarbamate (Cumate)
Selenium diethyl dithiocarbamate (Ethyl Selenac)
N-cyclohexyl-2-benzothiazole sulfenamide (Santocure)
Tetramethyl thiuram monosulfide (Monex)
Diphenyl guanidine (DPG)
Dipentamethylene thiuram tetrasulfide (Tetrone A)
Zinc dibutyl dithiocarbamate (Butyl Zimate)

In order to point out more fully the nature of the present invention, the following specific examples are given of illustrative methods of compounding the present compositions. In the following examples penetration values are given in terms of millimeters of penetration by a penetrometer needle point at a loading of 150 gms. The hardness values were measured with a Shore Durometer, either A or C as indicated. All cures were at 220° F. the indicated number of hours.

EXAMPLE 1

A quantity of a conventional oil-extended GR–S rubber containing 100 parts by weight of rubber and 30 parts by weight of oil was placed on a mill and 5 parts of RPA No. 3, 5 parts of zinc oxide and 1 part of stearic acid was milled therein. Milling was continued until the rubber softened and then additional oil (Circosol 2XH as defined above) was added in small increments and worked into the rubber until 300 parts had been added. To the mixture as thus prepared the following compounding ingredients were added: 12 parts of Captax, 6 parts of Tuads, 18 parts of DPG, 20 parts of carbon black (Kosmobile S) and 6 parts of sulphur. These ingredients were thoroughly mixed with the oil-rubber mass for 10 minutes. Thereafter 1892 parts of 50 to 100 mesh ammonium nitrate was screened into the mixture and the batch mixed for an additional period of 80 minutes.

In the course of the mixing a certain amount of air was incorporated in the mixture and to eliminate this air the batch was placed under a 25″ vacuum and mixing continued for 15 minutes. The batch was then transferred to a pouring can and deaerated for a further 15 minute period. A sample was then cast and cured in an oven at 220° F. for 24 hours.

The resulting product was a rubbery solid having a Shore A durometer hardness of 90. Ignition of this material occurred without delay. On burning, the propellant developed an average chamber pressure of 400 p.s.i. and the burning rate was 0.294 in./sec. The exhaust gas was smokeless until immediately before it burned out, at which time there was a small amount of black smoke.

EXAMPLE 2

The procedure of Example 1 was followed except that the recipe was modified by varying the proportions of curing agents as indicated in Table I to give the results set forth in Table I. In all cases the compositions contained 85% ammonium nitrate, 3% ammonium dichromate and 12% of the ingredients listed in the table. The listed ingredients are given in parts by weight and the method of determining hardness and penetration was as explained above.

*Table I*

| GR-S Rubber | 100 | 100 | 100 | 100 |
|---|---|---|---|---|
| Circosol 2XH | 300 | 300 | 300 | 300 |
| Sulfur | 6 | 4 | 2 | 2 |
| Captax | 12 | 4 | 24 | 12 |
| Tuads | 6 | 4 | 2 | 1 |
| DPG | 18 | 12 | 36 | 18 |
| Kosmobile S (Carbon Black) | 20 | 10 | 40 | 20 |
| ZnO | 5 | 5 | 5 | 5 |
| RPA No. 3 | 5 | 5 | 5 | 5 |
| Stearic Acid | 1 | 1 | 1 | 1 |
| Cure time (220° F.) | 24 | 29 | 24 | 73 |
| Penetration | 2.4 | 4.0 | | 2.5 |
| Hardness (C) | 65 | 46 | 25 | 35 |

EXAMPLE 3

To show the effect of variations in the amount of oxidizing agent a number of samples were prepared in accordance with Example 1 but with the varying amounts of oxidizing agent indicated in Table II.

*Table II*

| Ammonium Nitrate, Percent | 78 | 81 | 85 | 91 |
|---|---|---|---|---|
| Ammonium Dichromate, Percent | 2 | 2 | 3 | 3 |
| Cure time (220° F.) | 24 | 21¼ | 24 | 24 |
| Penetration | | 3.5 | 2.9 | |
| Hardness (A) | 67 | 68 | 92 | 85 |
| Hardness (C) | 26 | 30 | 65 | 45 |

EXAMPLE 4

In another series of tests the procedure of Example 1 was followed except that the quantity of oil and certain of the compounding ingredients was varied as indicated in Table III. All samples contained 80% ammonium nitrate as an oxidizing agent.

*Table III*

| GR-S | 100 | 100 | 100 | 100 | |
|---|---|---|---|---|---|
| Circosol | 1,000 | 500 | 400 | 125 | |
| ZnO | 5 | 10 | 5 | 5 | |
| RPA No. 3 | 5 | 5 | 5 | 5 | |
| Stearic Acid | 1 | | 1 | 1 | |
| Sulfur | 20 | 10 | 6 | 6 | |
| Captax | 20 | 10 | 12 | 12 | |
| Tuads | 20 | 10 | 6 | 6 | |
| DPG | 60 | 30 | 12 | 18 | |
| Kosmobile S | 20 | 20 | 20 | 20 | |
| Cure time (220° F.) | 24 | 19 | 19 | 24 | |
| Penetration | 1.6 | 2.2 | 2.0 | 1.7 | |
| Hardness (A) | 95 | 95 | 85 | 90 | 88 |
| Hardness (C) | 65 | 65 | 50 | 55 | 50 |

EXAMPLE 5

To illustrate the effect of variations in the plasticity of the rubber used a number of samples were prepared according to the procedure of Example 1 but with the modifications indicated in Table IV. The first three samples contained 80% ammonium nitrate and the fourth sample 85% ammonium nitrate and 3% ammonium dichromate as oxidizing agents.

*Table IV*

| GR-S High Mooney | 100 | | | |
|---|---|---|---|---|
| GR-S Normal Mooney | | 100 | | |
| GR-S 15-20 Mooney | | | 100 | |
| GR-S 5-10 Mooney | | | | 100 |
| Circosol 2XH | 1,000 | 500 | 400 | 300 |
| ZnO | 5 | 10 | 5 | 5 |
| RPA No. 3 | 5 | 5 | 5 | |
| Stearic Acid | 1 | | 1 | 1 |
| Sulfur | 20 | 10 | 6 | 6 |
| Captax | 20 | 10 | 12 | 12 |
| Tuads | 20 | 10 | 6 | 6 |
| DPG | 60 | 30 | 12 | 18 |
| Kosmobile | 20 | 20 | 20 | 20 |
| Cure time (220° F.) | 24 | 19 | 19 | 24 |
| Penetration | 1.6 | 2.2 | 2.0 | 1.5 |
| Hardness (A) | 95 | 95 | 85 | 95 |
| Hardness (C) | 65 | 65 | 58 | 60 |

EXAMPLE 6

A number of samples were prepared with varying quantities of ammonium perchlorate as indicated in Table V. In other respects the procedure used was the same as Example I.

*Table V*

| Ammonium perchlorate, percent | 67 | 73 | 76 | 81 | 84 | 87 |
|---|---|---|---|---|---|---|
| Cure time (220° F.) | 24 | 25½ | 24 | 24 | 24 | 24 |
| Penetration | 4.1 | 4.5 | 3.0 | 2.5 | 2.1 | 1.2 |
| Hardness (A) | 30 | 30 | 50 | 70 | 75 | 95 |
| Hardness (C) | 5 | 10 | 15 | 25 | 25 | 72 |

EXAMPLE 7

200 parts by weight of polybutadiene were placed on a mill and 115 parts of oil (Circosol 2XH) were added to the polymer and incorporated therein by milling. The oil-extended polymer was then transferred to a Banbury mixer and an additional 685 parts of oil incorporated in the polymer. During mixing in the Banbury, 2 parts of stearic acid and 10 parts of zinc oxide were thoroughly dispersed in the polymer.

To the oil-extended polymer as thus prepared various curing ingredients were added as described in Example 1, and thereafter finely divided ammonium nitrate and ammonium dichromate were added in such quantities as to provide a mixture having the following composition in parts by weight:

| | |
|---|---|
| Oil-extended butadiene containing stearic acid and zinc oxide | 11.97 |
| Sulfur | 0.28 |
| Captax | 0.43 |
| Tuads | 0.28 |
| DPG | 0.57 |
| Kosmobile | 0.47 |
| Ammonium nitrate | 83.0 |
| Ammonium dichromate | 3.0 |

The resulting mixture was cured at 220° F. for 48 hours to give a rubbery solid having a hardness of 60 as measured the Shore C durometer and a pentration of 1.1 mm.

EXAMPLE 8

76 parts of Circosol 2XH was incorporated in 200 parts of smoke sheet on a mill, and the mixture transferred to a Banbury mixture wherein 2 parts of stearic acid, 10 parts of zinc oxide, and an additional 725 parts of the oil were mixed with the rubber. Thereafter curing and oxidizing agents were added as in Example 7 to give a mixture having the same composition in parts by weight as that of Example 7, except that 11.97 parts of the oil-extended smoke sheet replaced the 11.97 parts of oil extended butadiene.

This mixture was cured for 24 hours at 220° F. to give a rubbery solid having a Shore hardness C of 53 and a penetration of 1.4 mm.

It should be apparent from the foregoing description and examples that the present invention provides a composition capable of achieving the several objects of the present invention. The composition may contain as much as 90% or more of oil and still have a rubbery texture. The composition burns rapidly at a uniform rate and the rate of combustion can be varied by changing the amount or state of subdivision of the oxidizing agent therein. Because of its rubbery texture it does not crack or disintegrate due to physical or thermal shocks.

Because of its unique properties the present composition has many uses. Thus it is well suited for use as a rocket fuel and for other propellant uses such as power units for guided missiles, starters for turbojet engines, operation of catapults and driving piles and fence posts. In addition the composition has a number of non-propulsive uses.

For examples, it may be used as a signal flare, or as a gas generator for a variety of applications where gas under pressure is required. More generally it may be used with advantage in any case where a relatively small, concentrated source of heat or power is required.

As pointed out above the uncured product may be quite fluid and hence lends itself to being poured into containers which may have intricate shapes or small recesses. The entire container can then be placed in an oven and the product cured to a rubbery gel in situ in the container. Such in situ curing is advantageous for a number of the applications mentioned above. On the other hand higher loadings of oxidizing agent or smaller quantities of oil may be used, if desired, to give a more nearly solid product that can be conveniently extruded in various shapes prior to curing.

It is of course to be understood that the foregoing description and examples are illustrative only and that numerous changes can be made in the ingredients and proportions of the present composition without departing from the spirit of the invention as set forth in the accompanying claims.

I claim:

1. A combustible composition containing at least a substantial part of the oxygen required for its combustion, said composition consisting essentially of an elastic gel wherein the liquid component is a readily combustible hydrocarbon oil having a pour point of —10° to 50° F. and the solid component is a rubber cured at a temperature between room temperature and 250° F. with a curing agent for rubber, said composition containing from 1 to 25 parts by weight of oil per part of rubber, said gel having uniformly distributed therethrough a finely divided inorganic oxidizing salt.

2. A combustible composition containing at least a substantial part of the oxygen required for its combustion, said composition consisting essentially of an elastic gel wherein the liquid component is a hydrocarbon oil having a pour point of —10° to 50° F. and the solid component is a rubber cured by heating at a temperature between room temperature and 250° F. with a curing agent for rubber, said composition containing from 1–25 parts by weight of oil per part of rubber, said gel having uniformly distributed therethrough from 10 to 95% by weight of a finely divided inorganic oxidizing salt.

3. A composition according to claim 2 and wherein said rubber is a butadiene-styrene copolymer.

4. A combustible composition containing the oxygen required for its combustion, said composition consisting essentially of an elastic gel wherein the liquid component is a hydrocarbon oil having a pour point of —10° to 50° F. and the solid component is a rubber cured by heating at a temperature between room temperature and 250° F. with a curing agent for rubber, said gel having an oil-rubber ratio of 1:1 to 25:1 and having uniformly distributed therethrough from 65% to 95% of a finely divided inorganic oxidizing salt selected from the group consisting of ammonium, sodium and potassium salts of nitric, chloric and perchloric acids.

5. A composition according to claim 4 and wherein said oxidizing agent is ammonium perchlorate.

6. A composition according to claim 4 and wherein said oxidizing is ammonium nitrate.

7. A combustible composition containing at least a substantial part of the oxygen required for its combustion, said composition consisting essentially of an elastic gel wherein the liquid component is a hydrocarbon oil having a pour point of —10° to 50° F. and the solid component is a buatadiene-styrene copolymer cured by heating at a temperature between room temperature and 250° F. with a curing agent for rubber, said composition containing from 1 to 25 parts by weight of oil per part of copolymer, said gel having uniformly distributed therethrough a finely divided inorganic oxidizing salt.

8. A combustible composition containing the oxygen required for its combustion, said composition consisting essentially of an elastic gel wherein the liquid component is a hydrocarbon oil having a pour point of —10° to 50° F. and the solid component is a butadiene-styrene copolymer cured by heating at a temperature between room temperature and 250° F. with a curing agent for rubber, said composition containing from 1 to 25 parts by weight of oil per part of copolymer, said gel having uniformly distributed therethrough from 65% to 95% by weight of finely divided inorganic oxidizing salt.

9. The method of making a combustible composition having at least a substantial part of the oxygen required for its combustion which comprises incorporating a readily combustible hydrocarbon oil having a pour point of —10° to 50 F., in rubber to form a liquid mixture containing from 1 to 25 parts of oil per part of rubber, dispersing from 10% to 95% of a finely divided inorganic oxidizing salt in said liquid mixture, and curing the resulting mixture by heating at a temperature between room temperature and 250° F. with a curing agent for rubber to form an elastic gel.

10. A method according to claim 9 and wherein the oil is incorporated in the rubber by milling.

11. A method according to claim 9 and wherein the oil is incorporated in the rubber by soaking the rubber in oil.

12. A method according to claim 9 and wherein the oil is incorporated in the rubber by precipitating the rubber from an emulsion in the presence of the oil.

13. The method of making a rubbery combustible composition which comprises mechanically working into a solid, uncured rubber from 1 to 25 parts by weight of a hydrocarbon oil having a pour point of —10° to 50° F. per part by weight of said rubber to form a liquid mixture, and curing the resulting liquid mixture by heating at a temperature between room temperature and 250° F. with a curing agent for rubber to form an elastic composition.

14. A method according to claim 13 and wherein said rubber is a polybutadiene-styrene copolymer.

References Cited in the file of this patent

UNITED STATES PATENTS

| | | |
|---|---|---|
| 2,067,213 | Snelling | Jan. 12, 1937 |
| 2,570,990 | Southern et al. | Oct. 9, 1951 |
| 2,574,466 | Clay et al. | Nov. 13, 1951 |

FOREIGN PATENTS

| | | |
|---|---|---|
| 655,585 | Great Britain | July 25, 1951 |